United States Patent
Godager

(10) Patent No.: US 8,319,657 B2
(45) Date of Patent: *Nov. 27, 2012

(54) SYSTEM AND METHOD FOR WIRELESS COMMUNICATION IN A PRODUCING WELL SYSTEM

(75) Inventor: Øyvind Godager, Stavern (NO)

(73) Assignee: Well Technology AS, Stavanger (NO)

(*) Notice: Subject to any disclaimer, the term of this patent is extended or adjusted under 35 U.S.C. 154(b) by 810 days.

This patent is subject to a terminal disclaimer.

(21) Appl. No.: 11/577,067

(22) PCT Filed: Oct. 11, 2005

(86) PCT No.: PCT/NO2005/000376
§ 371 (c)(1),
(2), (4) Date: Oct. 24, 2008

(87) PCT Pub. No.: WO2006/041309
PCT Pub. Date: Apr. 20, 2006

(65) Prior Publication Data
US 2009/0067288 A1  Mar. 12, 2009

(30) Foreign Application Priority Data
Oct. 12, 2004  (NO) .................................. 20044339

(51) Int. Cl.
*E21B 47/18* (2006.01)
(52) U.S. Cl. .................................. 340/854.6; 166/66.6
(58) Field of Classification Search ............... 340/854.6; 166/66.6
See application file for complete search history.

(56) References Cited

U.S. PATENT DOCUMENTS

| 3,970,877 | A | 7/1976 | Russell et al. |
| 4,078,620 | A | 3/1978 | Westlake et al. |
| 4,703,461 | A | 10/1987 | Kotlyar |
| 5,586,084 | A | 12/1996 | Barron et al. |
| 5,941,307 | A | 8/1999 | Tubel |
| 6,253,847 | B1 | 7/2001 | Stephenson |
| 6,414,905 | B1 * | 7/2002 | Owens et al. .................. 367/83 |
| 2001/0040379 | A1 | 11/2001 | Schultz et al. |

FOREIGN PATENT DOCUMENTS

| WO | 02065158 A1 | 8/2002 |
| WO | WO-02059459 * | 8/2002 |
| WO | 2005005778 A1 | 1/2005 |

OTHER PUBLICATIONS

John Lovell; "A Solutions Approach to Underbalanced Telemetry", IADC Underbalanced Technology Conference; Nov. 27, 2001; 1-11; XP008058219.

* cited by examiner

*Primary Examiner* — John Kreck
(74) *Attorney, Agent, or Firm* — Duane Morris LLP

(57) ABSTRACT

The invention relates to a system and method for wireless communication in a producing well system associated with oil and gas production, comprising at least one well bore. The system comprises at least two communication units, the communication units each comprising a transmitter and/or receiver for sending and/or receiving data, at least one, control unit for controlling the communication between the communication units.

26 Claims, 8 Drawing Sheets

SYSTEM AND METHOD FOR WIRELESS COMMUNICATION IN A PRODUCING WELL SYSTEM

This invention regards a system and a method for single-direction, two-way as well as intra-system/intra-module wireless communication in a well system comprising at least one well.

BACKGROUND

Numerous of today's wells related to the production of hydrocarbons are completed with permanently installed monitoring devices for measuring data such as pressure, temperature, flow rate, flow composition, flow direction, sand and other. In addition, many wells are completed with permanently installed instrumentation and devices in order to enable both remote monitoring and control of that well, eliminating the need for any well intervention. The control devices comprise means for controlling influx of produced fluids (and the out flux of injected fluids) such as valves, sliding sleeves, downhole chokes and similar. Wells that include permanent systems for remote monitoring and control are often referred to as intelligent completions.

In relation to this, communication is becoming a very vital concept in borehole instrumentation systems. The systems that are being developed consist of a number of different devices, where each device typically is capable of executing one specific task. If these devices are to work properly together, they must be able to communicate with each other. To do this, they must be physically connected and, equally important, they must speak a common language. Particularly in monitoring and controlling well production there is a need for transmitting data and commands in any direction along a wellbore completion. For example is there a need for transmitting measurement data from the wellbore to the surface, there may be a need for transmitting commands to tools in the well, or instruments located in different locations in the wellbore may need to exchange information.

EXISTING METHODS

As per today, the vast majority of related communication (i.e. communication in a producing well) is achieved by means of combined communication/power lines (cables) that are that are run along the entire length of the production tubing. Tailor made clamps are used to secure the cable to the tubing. Communication through cables is a fast and efficient method, but it has several drawbacks. Cable based well completion systems are expensive and complex to install and provide limited possibilities for remedial should one or more system component(s) fail to work. Should a system component fail, there is a significant risk that the only mean for remedial is recompleting the well an operation that is associated with significant risk and cost. Should a downhole valve fail to operate, this could be overridden by means of well intervention techniques at a somewhat lower cost. However, in many cases, if the system or one/more of its components fails, remedy work is considered too costly, hence the remote operation functionality (i.e. monitoring and control) of the given well is lost. There exist numerous wells with a lack of downhole monitoring and control due to this fact.

There are several scenarios existing in the oil business today where cable based communication is not possible. One of these is branch wells, or multilateral wells, where one drills one motherbore with several "branches". The idea with multilateral wells is to drain a large part of the reservoir without having to drill full-length well sections for each target. In addition, one saves slot-space on the platform/template by using this method. The junction between the motherbore and a branch is not possible to cross with a cable connection. Hence, cable connections cannot be applied for monitoring and control of branch wells reservoir zones. Due to this, with today's technology limitations, large reservoir sections risk to be completed without monitoring or means for downhole production control.

Well intervention techniques could be used to increase the data acquisition and perform production control tasks. However, where permanent monitoring provides a continuous data stream, a well intervention will provide a "snap-shot" only, hence it is not regarded an appropriate replacement for permanent monitoring. In addition, in particular on subsea wells, well intervention is often considered so expensive that the operation is deemed non-economic. In this case, well intervention is undesired as a control mean, too. Well intervention into branches of multilateral wells is in most cases impossible.

In light of the issues discussed in this section, a search for wireless communication techniques has been initialised by the industry. There are a few emerging techniques for wireless communication in wells, amongst them techniques using acoustic and electromagnetic signal transmission and receiving principles. However, such techniques have as per today only been proven for monitoring purposes only, and in relatively shallow wells. Issues such as signal transmission distance and energy consumption are still considered significant challenges for these techniques.

Existing and very common wireless techniques applied for drilling purposes are Measurement While Drilling, MWD (alternatively Logging While Drilling, LWD) techniques. These are based on rapid pressure pulses, generated by downhole. "pulser" devices that travel through the drilling mud by the speed of sound in a closed-loop system in order to communicate borehole data to the surface. MWD/LWD is used in conjunction with the drilling of the well and is not considered adaptable to producing well systems. The reason for this is that producing wells contain free gas, which prevents the MWD/LWD methods from being applicable in a reliable manner, as signals are excessively dampened in the gas phase. MWD/LWD techniques comprise transmitting signals through a fluid (drilling mud) that is pumped into the drillpipe during tie drilling process, i.e. the transmission medium can be "trapped" between tie surface pumps and a device modulating the circulation of the drilling fluid, i.e. operating in a closed-loop configuration in most known applications. Also, for MWD/LWD processes, the fluid column (drilling mud) is a continuous medium throughout tie process line of signal transmission and the well is not producing during MWD/LWD. However, for underbalanced drilling scenarios, some well/reservoir fluid is permitted to flow into the borehole during drilling, but this inflow pattern deviates significantly from the commercial production case.

In relation to the same process, i.e. drilling, there exist techniques to program downhole Directional Drilling (DD) tools by means of wireless signals transmitted from surface to the downhole components (located in the drilling assembly). It is known technique to achieve such communication by means of a diverter valve on surface that diverts parts of the fluid (drilling mud) that is pumped into the drill string. Hence, a varying-rate-modulated pattern is achieved. The downhole devices read this, whereupon the downhole tools are re-programmed. As for MWD/LWD, these techniques are based on a closed loop configuration with a continuous liquid column in the flow process and the fact that the process is drilling—and not a producing well.

No intelligent well completion and/or multilateral completion that are based on wireless communication techniques for monitoring and control is known to exist.

THE OBJECTIVE OF THE INVENTION

The objective of the invention is to provide a novel and alternative system for single-direction, two-way as well as intra-module wireless communication in a flow process, and specifically in wells related to production of hydrocarbons, as well as a method for single-direction, two-way as well as intra-module wireless communication in a flow process, and specifically in wells related to production of hydrocarbons.

In one specific range of embodiments of the invention, one enables wireless communication scenarioes in one or more wells related to the production of hydrocarbons, including but not limited to the following:

Communication of downhole sensor data to surface
Communication in the form of commands transmitted from surface in order to operate downhole production control devices such as valves
Communication of data representing the status of downhole devices to surface
Communication to and from permanently installed monitoring and control system located in branches of multilateral wells.
Remote activation of downhole completion products from surface, such as "disappearing plugs", barriers, circulation sleeves and similar
Intra-well communication, i.e. information exchange between system modules
Remote wireless initiation of processes such as plug setting, perforation and data acquisition

THE INVENTION

The invention comprises a system and a specific method for wireless communication in a flow process, and specifically in wells related to the production of hydrocarbons.

More specifically, the invention comprises a system for wireless communication in a producing well system associated with oil and gas production, comprising at least one well bore, the system comprising at least two communication units, the communication units each comprising a transmitter and/or receiver for sending and/or receiving data, and at least one control unit for controlling the communication between the communication units.

The communication units may comprise any kind of transmitter and/or receiver. In a preferred embodiment, the transmitter and/or receiver are adapted for transmitting and/or receiving signals by means of the well fluid, and in one particular embodiment, by means of generating and/or reading static fluctuations in the well fluid.

A major difference from MWD/LWD techniques, as well as techniques for programming DD tools, is that the invention applies static pulses of which time intervals equals or exceeds the time constant for the producing well system, while the MWD/LWD systems applies short "events" which propagate in the drilling mud with the speed of sound, These short "events" cannot be used in a producing well due to i.a. gas content in the production fluid flow which will degrade the signal and make it impossible to interpret.

The number of communication its can vary, and the flexibility of the system provides that in practice there is no upper limit on how many devices that can be employed in the same system.

The system could be centred in the process stream, or the system could be annular, allowing the process stream to flow through it, or a combination of centred and annular.

It should be noted that the objective of this invention does not refer to any capability or hardware for automated self-control of the well or reservoir, but relies on apparatus and technology strictly to interface instrumentation for monitoring purposes or to initiate commands to devices in the well. Saying this, it should be noted that the system may be integral part and/or interface directly to wellbore flow-control valves or chokes for transmission of pressure pulses.

An example of a typical in-well application is automatic process control where set points and commands of a process control loop must be communicated, as well as a need for transmission of feedback data. For example may readings of positions of sliding sleeves or choke valves be transmitted to control units or to other units in the well. The system may be used for transmitting different types of data, for example measurement data from sensors/detectors arranged in the well, control signals to tools in the well, feedback-signals from tools in the well, etc.

In one embodiment, the communication units are physically connected to the process pipe. In a further embodiment of the system according to the invention, the communication units have equal access to the data transmitted in the well fluid simultaneously. This may e.g. be the case when the data is transmitted by means of (slow) fluctuations in the well fluid.

The term "well" in the context of tis document means one or more wells connected together. Examples on well systems are lateral wells and satellite well systems and also include one single well.

The invention also comprise a method for communicating in a well system comprising at least one well bore, where the method comprises providing at least two communication units, the communication units each comprising a transmitter and/or receiver for sending and/or receiving data, and at least one control unit for controlling the communication between the communication units, and sending data from one communication unit to another.

Data Sources and Devices/Systems that Inquire Data

Data sources, i.e. devices that provide data to be communicated could be any kind of commercial data sensor related to measuring process parameters, for example quartz sensors to monitor downhole pressure and temperature, as well as sensors to monitor the status of devices as valves and similar In addition, data sources could be command centres or equivalent, that is used to monitor and control the flow process. For example: A production operation central for monitoring of an oil field could initiate a command to increase choking in one particular reservoir zone in a chosen well. This command would then be wireless transferred to the downhole environment by means of the apparatus/system and method according to the invention.

Similarly, data that are received by a system receiver can be forwarded to a system/device that inquires data. This could be the surface operation central for monitoring an oil field, a downhole device that awaits activation command from surface or a downhole sensor awaiting a request to report data to surface.

In one embodiment of the invention, the system interfaces with $3^{rd}$ party sensors, devices and control centres in order to communicate relevant data to and from such through the flow process.

In another embodiment of the invention, the apparatus/system includes relevant sensors and devices, and is linked to tailor-made control centres, for the operations of interest on that particular well/flow process system.

In another embodiment of the invention, the apparatus/system comprises a combination of included/in-built and 3$^{rd}$ party sensors, devices and/or control centres.

Data Conversion

In one embodiment, the communication units and/or the control unit comprise data conversion means to convert data for transmission. This is particularly useful when the system is used for transmitting measurement data from sensors/detecting means in one or several locations in the well. The measurement data may then be converted to be suitable for transmission through the system. The system may e.g. be used for communication between different locations within the well as well as transmission of the data directly from the well to above the well and vice versa.

The means for data conversion convert the data to be transmitted to an integer value or similar simplified number representation. This is done to simplify the transmission of the data and to increase the rate of data transmission due to relatively high resolution and complexity of raw measurements or code in a data bank. This is a kind of data-compression technique, pre-processing data into a preferred small-sized format particularly adapted for transmission over a relative low bandwidth communication link. For example can data from downhole sensors be converted to an integral number representing the measurands and then be transmitted, or be transmitted as a direct letter representing raw data or an engineering unit.

In the same manner, data that are received by a system receiver are, if relevant, converted to a required format prior to submission to the system/device that inquire data.

Data Transmission and Receipt

The data transmission means creates a message format of the converted data to be transmitted by static pressure pulsing. The number generated by the data conversion means may be modulated for transmission by any coding or modulation techniques, for example utilizing a DPSK (Differential Phase Shift Keying) modulation technique, resulting in good transmission efficiency and low error rates.

In one preferred embodiment of the invention, the data is transferred by use of base band transmission. Base band transmission is an efficient method for transmission through a limited bandwidth link. It is thus suited for data transmission in e.g. a process pipe. Base band transmission uses no carrier frequency modulation, but the data are transmitted directly as pulses in the well fluid. Because there is no modulating/demodulating circuitry, the data transmission means may be less complex and thus suited to a low-bandwidth link.

Data receivers comprise sensors that are able to read the static pressure signals. In the preferred embodiment, such sensors are pressure sensors. In another embodiment of the invention, such sensors are process flow rate and/or velocity measurement devices.

Control Means

The control means may be a separate unit or may be an integrated part of e.g. the data transmitter/receiver means. In one embodiment, the means for data conversion, data transmission/receiving and control may be integrated in one unit. The control means control the system.

In one embodiment of the invention the control means may e.g. be programmed to log downhole data (sensor data or device status data) at a certain sampling rate for transmission to the surface receiver.

The control means may include processing means to be able to perform simple processing, such as calculating the mean value of the sensors over a certain time period for transmission of the mean value only or other desirable operations. The control means may receive and respond to instructions transmitted from another location, such as from a control system outside the well and may be adapted to receive and forward signals from other signal sources or other similar systems.

In one embodiment, the control mean is set up to interrogate and operate several remote system modules. This can be the case for wells with multiple producing zones, multilateral wells and similar.

In one embodiment of the system, the control unit is integrated in a communication unit Such an embodiment has the advantage of fewer units to be installed in the well.

In one embodiment of the invention, the control module is located on or in the near proximity of the wellhead, for example on the flow line, the choke module, etc.

In one embodiment of the invention, the control module is located in the well, attached to the production tubing and communicated to/from by means of cables, that are attached to the tubing to surface. This control module communicates to/from one or multiple remote downhole system components. Such components could be located at various reservoir zones of a monobore well, alternatively in one/multiple branch(es) of one/several multilateral well(s).

System Power

In one embodiment of the invention, the system components that are located on surface/seabed or in the upper (downstream) regions of the flow process (well) are powered through conventional lines/cables with power interfaces as is standard in the industry today.

For powering of downhole (upstream) system components, alternative means have to be uses as the system by nature is wireless, hence there is no cable connection to the downhole (upstream).

The downhole power source may be self-powering means that generates power from such as the flow, vibrations, and/or temperature of the process. Alternatively, seawater batteries using the annulus fluid as the electrolyte, annular generators (turbines) powered by pressure surges from surface, radioactive power generators can be utilised. Examples of such self powering devices are described in U.S. Pat. No. 3,970,877 (piezo-electric element bonded to a membrane), U.S. Pat. No. 6,253,847 (using seawater in a battery with the production string as cathode, a dissimilar metal as anode and the annulus fluid as electrolyte) and US-application 2000/0040379 (vibrations in fluid flow). In a preferred embodiment of the invention, a power source (generator) is combined with a re-chargeable battery and/or super capacitor in order to provide energy to the system for prolonged periods of time.

In one embodiment of the invention, the downhole power source is a non-renewable power storage such as a battery or other suitable power sources in the well. An important feature of the invention is expectedly low power consumption downhole, and hardly any increase in such as a function of signaling distance. This is a significant difference from alternative wireless communication systems proposed for the same application (i.e. wireless communication in a producing well).

In another embodiment, the non-rechargeable battery cell is replaceable by means of well intervention methods. In another embodiment a re-chargeable battery cell and/or super capacitor device is combined with a power generation module as described above. In another embodiment, the downhole system module is direct-driven by the said power generation device(s).

Installation and Retrieval

The invention may result in several embodiments with varying requirements and preferences with respect to installation and retrieval.

The surface/seabed system modules will be attached on or in near proximity to the wellhead, using standard industry interfaces for the attachment of sensors, interface units and cabling to a central surface unit, for example a data bank or a graphics screen. The surface installation is relatively similar both for new wells/completions as well as for installations on old wells (i.e. retrofit installations).

For new installations of systems with respect to the installation/completion or re-completion of process systems (i.e. wells), downhole components would typically be attached to the production string or equivalent by means of threaded connections or equivalent. This would mean a permanent installation, at least for some system components.

For retrofit installations, for example to remedy cable-based intelligent completions that have failed, or to convert a standard well to a wireless intelligent completion, the downhole system components can be installed in the well by means of well intervention methods. The means for installation and retrieval are standard means existing in the industry today and the system is installed in the well using techniques such as those known in this technical field as electric-line, slick-line, coiled tubing or tractor operations. These are all devices, tools and methods for placing, logging or maintenance operations in wells and related process systems.

In one general embodiment of the invention, downhole system components are replaceable, as a whole or on a component basis, using well intervention methods. In particular, this applies for power sources (batteries) and vulnerable components with lower expected lifetime than the rest of the system, for example electronics and sensors.

Anchoring

The system is in one embodiment of the invention attached in the completion by means of an anchoring device. In another embodiment of the invention, the downhole system components are threaded onto the tubing in a permanent installation.

In case of installation by means of an anchoring device, the anchoring device may be any suitable device adapted to attach a device to the well. The anchoring device may be adapted to fit into existing anchoring arrangements in the well. In one embodiment, the system interfaces towards known commercial anchoring devices, such as packers and gauge hangers. In another embodiment, anchoring is an in-built function in the system.

For the case of using a gauge hanger or analogue anchoring device: This relates to the case where the pulse generating device is a centered device that creates a pressure surge in the wellstream by means of expanding into the annulus between the tool body and the tubing wall.

For the case of using a packer or analogue anchoring device: This anchoring system comprises a seal towards the pipe wall of the tubing in order to lead the wellstream through the tool body, in order to generate pulses by an internal choke design. Hence, the packer provides for flow diversion, i.e. it gates the process flow through the static pulse generation module of the apparatus.

In one embodiment, a permanent installed system body with threaded connections to the production tubing for permanent installation is combined with retrievable system components, either retrievable as a whole, or on a component-by-component basis.

Vibration Control

In one embodiment, a vibration-reducing module is included in the system. Typically, this is located at some distance from the anchoring device, in order to reduce tool vibrations that can damage delicate components. In one embodiment, the vibration-reducing module is a commercial centraliser device, alternatively a commercial gauge hanger or packer with a stinger assembly in order to prevent the "tail" of the system from vibrating. In another embodiment, the vibration is controlled by means of an in-built camming device that forms part of the system.

Static Pulse Generation Device

The static pulse generation devices are adapted for generating static pressure fluctuations in the well process system. By definition, static hereby means pressure changes within the process system in the time domain equal to or beyond the time constant of the process system as defined later in this document. The apparatus incorporates one or more movable restriction devices (final operators or devices) or other devices, which are capable to change the flow of the production fluid in order to create a pressure drawdown or buildup (i.e. static pulse) within the process system.

Examples on applicable devices may be nozzle valves, needle valves, solenoid valves, gate valves, slide valves, globe (ball) valves, modulating flow restriction (umbrella device), cascade chokes, plug-and-cage chokes, sleeve-and-cage chokes and similar operated by an actuator. Also, for annular system versions, in-wall chokes could be used. These apply similar concepts as the other chokes mentioned, but the geometry would be a chamber inside a pipe wall (i.e. completely/partly annular geometry) rather than a centered choke in the midst of a pipe system centre.

In one preferred embodiment, the system choking device(s) are operated by one/more actuator(s). The actuator(s) may output any linear or non-linear, longitudinal, twisting/rotation or combination movement. The flow restrictions may be anchored directly on the inner walls of the process system so that a centred process flow is modulated, or the restriction may be a centred device in the process tube and thus modulating an annular or surrounding process flow, or the flow restrictions may be built in the pipe wall of an annular system. The actuator(s) may be electric operated, hydraulic operated, thermal operated or a combination of such, such as electro-hydraulic operated. The pulse generation device(s) may comprise one or several of the mentioned devices in parallel or series. The static pulse generation device(s) are controlled by the control means.

In an alternative embodiment of the invention, flow modulations rather than pressure modulations are utilised for signal transmission and receiving purposes.

In one embodiment of the invention, the pulse generation module is an annular/partly annular shaped device, in-built in the system pipe wall (for example in one/more chamber(s) between an outer and an inner mandrel), providing a non-invasive well component. In particular, this would be applicable for intelligent well applications, where a non-invasive solution would be attractive.

Fail-safe Overriding Device

A fail-safe overriding system may be provided, that ensures that the pulse generation device goes to a "passive" mode should the energy supply or any other system component fail to operate. By "passive" it is meant that the pulse generation device returns from whatever state it might have at the occurrence of a failure, back to the original position, where a minimum choking effect is imposed on the well flow. The intention of the fail-safe overriding system is to avoid the apparatus getting permanently locked in "active" position where it imposes a (minor) choking effect on the well system. This can be essential in cases where removal of the data transmission system and/or the pulse generating device cannot be performed shortly after the occurrence of a failure, to ensure that production can be maintained even if the data transmission is discontinued.

In one embodiment of the invention, the fail-safe function is in the form of a spring that is compressed by the actuator when in operational modus. Here, the actuator goes into "neutral" mode in the case of power failure, whereupon the spring returns the choke position to the original.

In a preferred embodiment of the invention, the fail-safe mechanism is in the form of a spring that is compressed by the actuator when in operational modus. In this case, the actuator is held in locked position by a dedicated device when non-operational. In case of a power failure or other system failure, the actuator-locking device brings the actuator from locked to neutral position, whereupon the spring returns the choke position to the original. The benefit with this arrangement is that it does not draw excessive power in order to hold the fail-safe spring compressed when in operational (choking) modus.

Signal Receivers and Interpretation Systems

In general, the system will utilize pressure sensors for reading the wireless signal. In a preferred embodiment of the invention, downhole system modules will incorporate one/more pressure sensor(s) in order to read the signal transmitted from surface or from other downhole components. Alternatively, the downhole system modules are connected to ($3^{rd}$ party) pressure sensors that are used for the purpose.

For surface system modules, one can use pressure sensors that already are in place in the wellhead (with associated computer hardware) to record the pressure pulses transmitted from the downhole telemetry system. In addition, a separate computer may be supplied together with the system, or alternatively software can be installed into existing computers associated with the well of interest. However, the surface system might also comprise pressure or alternative sensors that are installed in conjunction with the downhole system installation—for that specific purpose.

In one embodiment, surface signals are extracted from the existing surface Data Acquisition System (DAS) associated with the oilfield of interest. Data can be collected from the existing DAS that has been put in place for receiving data from the wellhead pressure sensors. This collection can be obtained by installing dedicated software, or by linking a separate computer to the existing DAS. This will monitor the pressure profile at the wellhead and extract data from the pressure fluctuations as defined and modulated in the time domain. In this way, one is provided with relevant data from the retrofit sensors downhole.

In another embodiment, the surface signals are acquired by bypassing the existing surface Data Acquisition Systems (DAS). A separate computer with the necessary software and interfacing can be connected to the communication link between the wellhead pressure sensor and the existing DAS. In this way, the pressure data is continuously monitored, and the pressure pulses are identified, by an independent DAS.

For an application where new surface sensors are supplied as a part of the installation, the same independent DAS will be used to read and interpret data.

In one embodiment of the invention, surface sensors are installed with the rest of the system in order to detect signal transmission. This could be the case should there not be any wellhead pressure sensors in place, or if such sensors have failed, or if such sensors have insufficient specs or a insufficient data sampling rate.

Typical Application and Operation

A preferred embodiment of the invention forms the communication apparatus for wireless, fully autonomous intelligent well completions. I.e. a continuous or time-defined communication goes back and forth in a well in order to communicate measurement values, status of devices, activation commands and similar.

In one embodiment of the invention, one operates a downhole component by means of a surface transmitter and a downhole receiver, only. Such operations could include the remote operation of completion valves (in connection with installation of the production tubing), circulation subs, packers, perforation guns and similar downhole devices for usage in oil wells.

In one embodiment of the invention, one conducts operation of downhole devices after a predetermined time-delay with reference to a given occurrence in the drilling, completion or production scheme.

In one embodiment of the invention, one interrogates downhole sensors and devices for relevant data according to a predetermined schedule.

In one embodiment of the invention, devices report status when measured values deviate beyond programmed set points.

In one embodiment of the invention, the transmitter and receiver are adapted for transmitting and receiving signals by means of the annulus fluid between the production tubing and the casing of the well, and in one particular embodiment, by means of generating and receiving fluctuations, in particular pressure fluctuations in the same annulus.

Initialisation

The system will preferably be initialised after installation, but before start of operation. This initialisation is performed by recording the time delay from the generation of the fluctuation in the fluid in one end of the system to the detection of the same fluctuation at the receiver station at the other end of the flowing process. This time delay gives a time constant that is used in interpreting the received signals. Typically, the downhole module will be programmed to initially transmit pulses at a pre-defined rate and a given pulse period during the start-up. The response curves will be monitored to tune the surface receiver according to the process tune constant (described later in this document) and pressure response.

Adaptive System

The system modules are designed to be adaptive control means, meaning that the pressure sensor is located downstream the pulse generator for the downhole components, and upstream the pulse generator for the surface components, respectively, and used in order to monitor and control the pulse transmission in a closed-loop configuration. Hence, an internal interrogation protocol utilises the feedback from the pressure sensor to adjust the choke position in order to enable an optimal pulse length, phase and amplitude in time domain that matches the process system.

Throughout the lifetime of the system, typically the active transmitters will tune according to the process system time constant and change the characteristics of the start pulse enabling the receiver device to calibrate amplitude and phase to the actual signal transmission rate. The reason for this is that oil reservoirs deplete over time, hence the fluid composition, flow rate, pressure states and consequently the time constant for a well of interest might change as a function of time.

Adaption is particularly important in producing wells producing from several locations in the well. In this case is each production point controlled or produces according to a calculated relation which is a function of the production pressure in the production line. Without this adaption process, the actual producing zones will exclude the possibilities for modulation of the process line pressure for communication. This can be illustrated by a given case where a well produces from 2 bores, bore A and bore B, respectively, where both bores are equipped with static pressure pulse devices in order to communicate with a surface control unit. Whenever bore A is about to communicate, it will create a pressure drop by means of operating its choke. Without an adaptive function in-built in the overall well communication system, the pressure drop in bore A could entail an increased production rate and increased pressure contribution from bore B. Hence, the modulation from bore A might be suppressed in a manner that prevented a readable signal from reaching the surface unit. In particular, this could be the case if bore B was the dominating bore in the well. However, by means of adaptive system features, when the bore B systems register signalling activity from bore A, the bore B pressure is adjusted accordingly in order to support the signalling process.

This is not an issue in the prior art MWD/LWD techniques, as these are performed in a closed system where the fluid flow rates are fully controlled by the operator and where the fluid flow does not comprise gas fractions.

REFERENCE TO FIGURES

The invention will now be described in more detail by means of the accompanying figures.

Figure 1A:
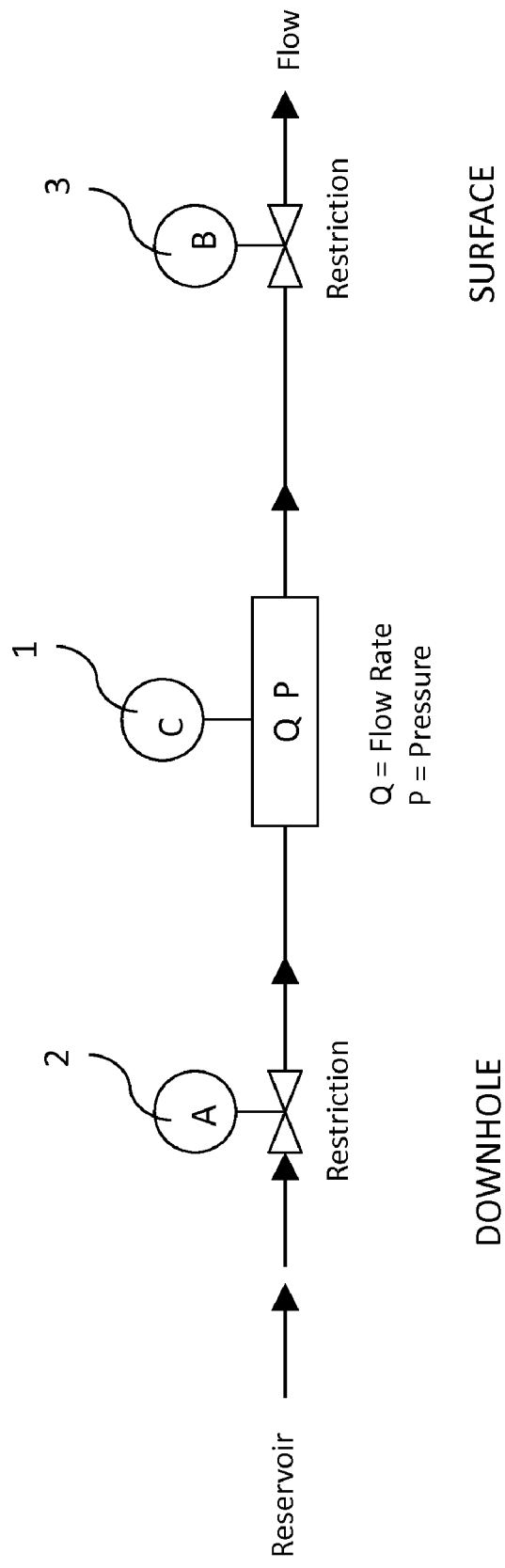
FIG. 1a is a simplified diagram of a system according to the invention in a borehole application.

The system according to the invention provides a wireless communication link and establishes point-to-point communication between devices in the well. FIG. 1a is a simplified diagram of an embodiment of the invention comprising a process flow line 1 which is terminated in both ends by two restrictions 2, 3. At the illustration, restriction denoted 2 is located upstream and restriction denoted 3 is located downstream of the flow process. The restrictions 2, 3 may be fixed or adjustable types, and when active, have a choking effect on the process flow rate in the flow 1. This means that a change of position of one of the restrictions 2, 3, will cause a change in the flow rate Q which in turn will induce a change in the operating pressure P of the same process flow line 1. Pressure P and flow rate Q is thus determined or controlled by the position or net choking effect of the restrictions 2, 3.

Moreover, this invention relates to a concept, apparatus, and techniques to establish a communication link between devices 2 and 3 of a flow-line or flow process 1. Communication is derived by modulation of parameters Q and/or P. As pressure P and flow rate Q is directly controlled by the net restriction of the flow-line, restrictions 2 and 3 are actively used to provide inter-communications on the line between the very same units. This in turn, defines that communication may be of either direction within the flow-line, i.e., from 2 to 3 or vice versa.

Due to laws of super-position, a change in position or choking of either device 2, 3 will induce a change in process parameters Q and/or P. Thus, as devices are part of the same circuit or flow-line 1 (process), changes in either parameter is picked up almost at the same time. However, this is not filly true as there will be a small time difference from a change is induced to it's picked up by a device. This defines the system timelag or response time and is a function of the throughput (Q) and the volume (V) of the flow process system. Typically the time lag will be very low bandwidth and defining the data rate of the communication link.

For communication means, we will call an induced change in the operating parameters Q and/or P—of the flow-line or process—"modulation". Thus, modulation is used as a means of "signalling or talking" to and between all devices connected to the system or physical link (here flow-line and process 1).

Moreover, this defines a Communication Link. By definition two or more devices must be connected to the link to establish a communication system or link.

All devices in a system have an internal front-end modem circuit continuously monitoring the line activity. This circuit provides a coding network, reading and converting the parameter changes in time domain to a predefined and mutual data or message format. In summary this defines a "static pressure pulsed telemetry system" and is intentionally developed for the purpose to be used in a flow process, for example a borehole that is producing hydrocarbons. It is a requirement that the borehole has a fluid or gas flow Q.

The illustration shows a process, flow-line and a communication link between two restrictions 2, 3. Typically for all applications the flow-line and process rate Q is considered as a "wild" flow process. Here the restrictions have two main functions, one to control the process flow rate Q and Pressure P and, secondly, for communication purposes. The latter, to induce small pulses or static changes in the "wild flow. We say the signal or modulation for communication means are superimposed on to the flow process.

All devices may or may not have apparatus and final elements for transmission and receipt of data on the physical link.

Figure 1B:
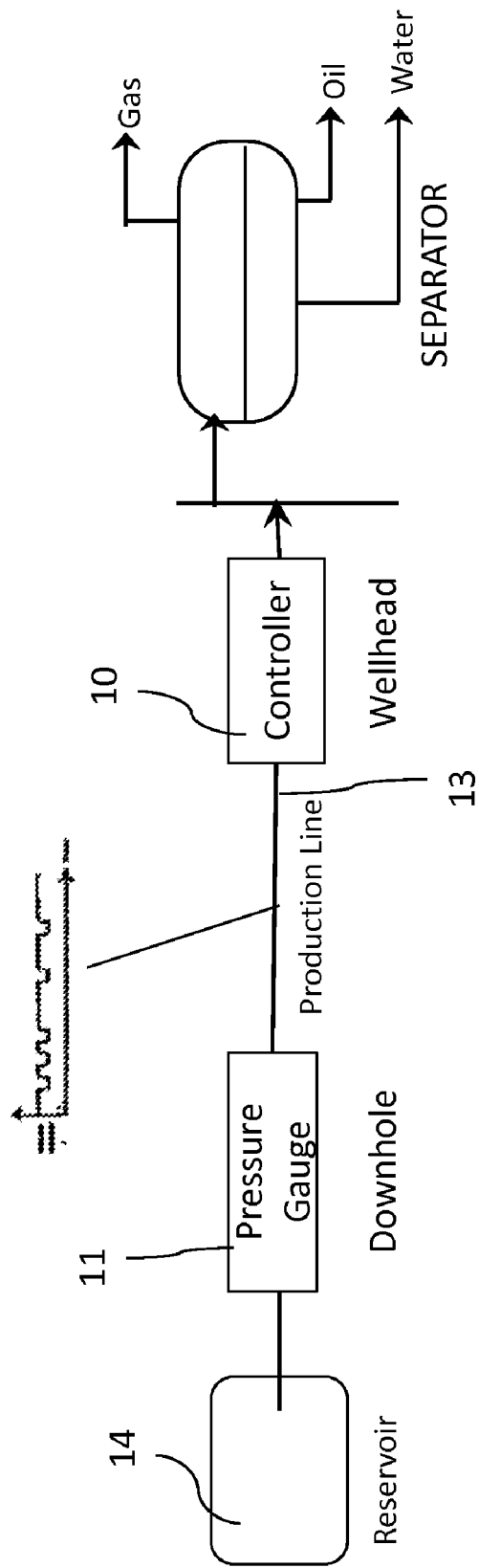
FIG. 1b is a simplified block diagram of an embodiment of a system according to the invention.

FIG. 1b illustrates the principle of an example system according to the invention. The system comprises a control unit 10, and a down hole instrument 11, eg. a pressure gauge for monitoring pressure in the production line 13 and/or the reservoir 14, and there is a need for communication between the units. The communication may be transmittal of measurements from the instrument to the control unit, transmittal of service level of the instrument, etc, and the control unit may transmit response signals or control signals to the instruments, etc. The two units 10, 11 are connected to the production line 13 which may be used as the transmission means. In this way it is achieved a bus type configuration, where information transmitted along the process pipe are equal accessible to both devices (simultaneously).

To be able to communicate, the units must transmit information in a form that is understood by all. The units must also support a common set of rules governing the communication. This is particularly important in the case where there are no control lines to support handshaking functions. The common set of rules and the format of individual messages are defined in an application specific communication protocol.

When using the well flow as a type of serial communication interface, information appears one bit at a time as pressure pulses or surges, alternatively volumetric or rate surges, in the process pipe connecting the communication units. Each message comprises a defied number of bits. In a system comprising two or more communication units, all communication is initiated and controlled by the control unit. To ensure a common language, a defined message structure must be established, which define the way a communication unit must operate to transmit information. The control unit is in charge of all interface operations, typically initiation of service device request, instrument measurements, initiation of transfer of data, remote actuation of downhole devices such as valves, etc.

Figure 2:
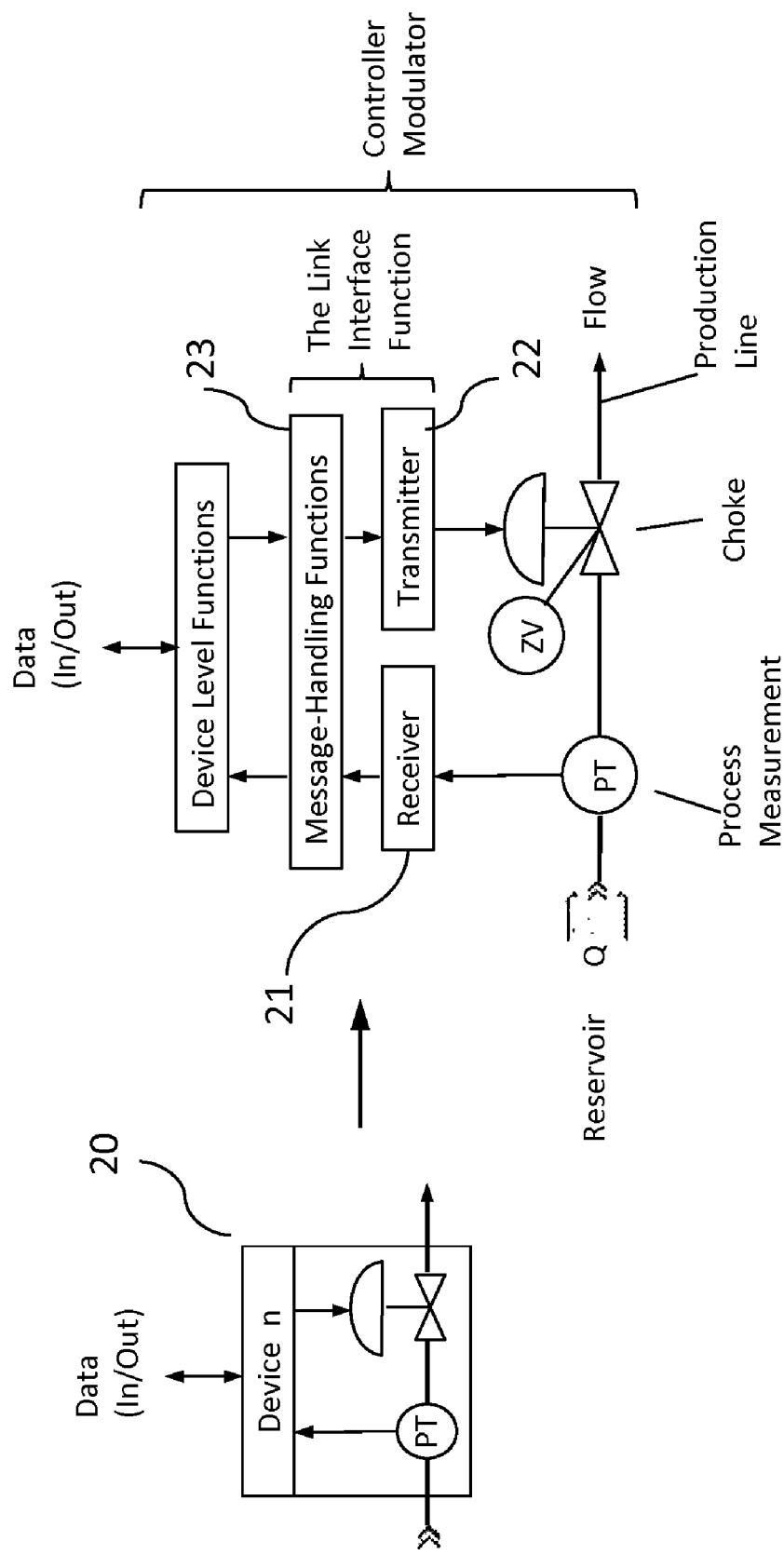
FIG. 2 shows schematically one embodiment of the invention comprising a number n communication units, connected to a device in the process pipe downhole.

FIG. 2 shows schematically one embodiment of the invention comprising a number a communication unit 20, connected to a device, eg. the device 11 or 10 in FIG. 1b, in the process pipe 13. The production pipe provides the physical link between the communication units and enables bidirectional access and communication between the units. The structure of the physical link resembles a parallel bus and each unit connected to the bus has equal access to the information on the bus simultaneously, but the interrogation of the units is performed sequentially and not in parallel. The figure illustrates the interface functions. Messages/data are received by the receiver block 21 and sent out via the transmitter block 22. The characteristics and function of the blocks will be described in more detail later. The message handling block 23 is a vital block and is responsible for such as detecting a message on the production line, and recognising the address of the message, recognising the requested action in the message, formatting new messages and forwarding them. The communication unit further comprises means for detecting and converting input signals from the transmission link to logic level and control means for loading the serial bit stream to an input buffer. Every message is sent as a sequence comprising a certain number of bits comprising a message "frame". The first bit, "start" or "sync" bit is coded to enable the communication units to recognize the start of a message being transmitted. The input detector logic must thus monitor the transmission line to detect the start bit. When a start bit has been detected, the following bit will be loaded. After a message frame has been loaded, the receiver logic decodes the message, transfers it and executes any orders.

Figure 3:
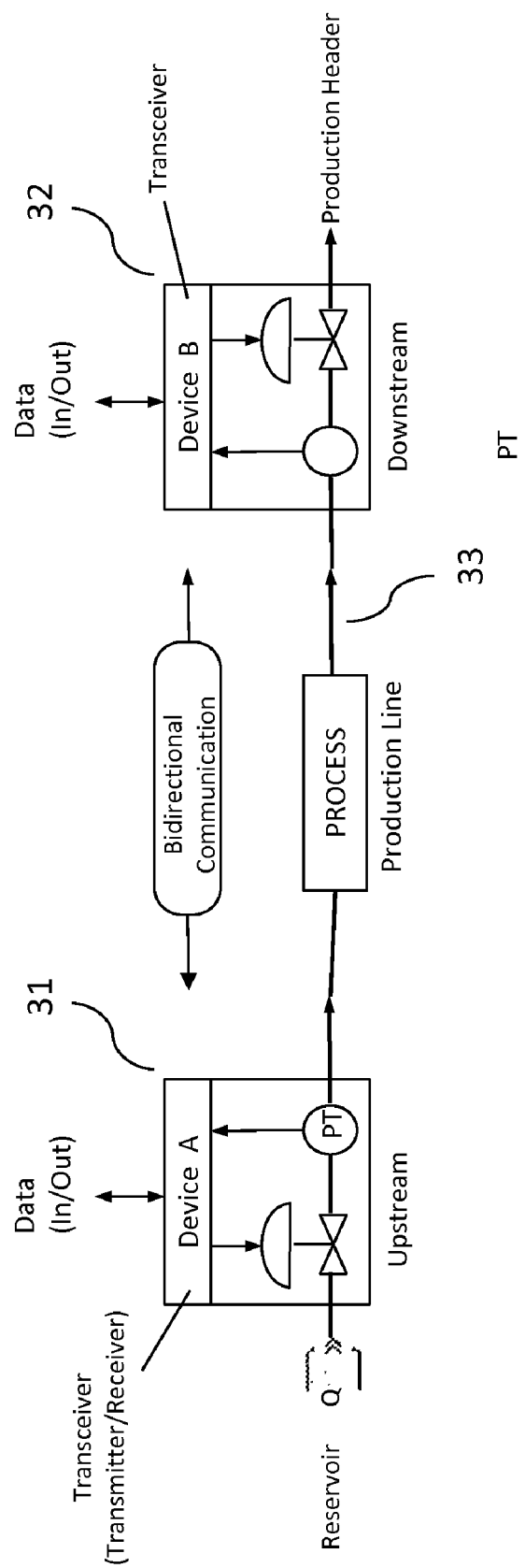
FIG. 3 shows an example on an embodiment of the invention where two devices communicate.

FIG. 3 shows an example on an embodiment of the invention where two devices 31 and 32 communicate by means of fluctuations in the flow in the production line 33. As an example, assume that a measurement was requested from the first device 31 by the second device 32, and the first device 31 returns the requested data. Both communications are performed by pressure modulating a data set (message frame) onto the production line.

The nature of the process line, and thus the communication link may vary from system to system due to process and pipe properties. In this embodiment the time constant, i.e. time delay from transmitting a pulse on the production line until this pulse is detected at the other unit, is depending on the volume of the process system as well as the properties of the fluid in the line. To achieve a sufficient time delay for a pulse to propagate from one end to another, a transfer model may be derived which mathematically describes the system. From the model the characteristic time constant of that particular process and configuration may be established.

The flow line production line) is a complicated dynamic system, but may be approximated by a single linear lag plus a distance-velocity lag. This model assumes infinite source capacity from the reservoir and a negligible end volume.

$$T = RC = \left(\frac{P_1 - P_2}{Q}\right) \cdot \left(\frac{V}{P_1 - P_2}\right) \text{ [min]} \qquad [1]$$

Where T is the time constant of the system, R represents the resistance in the system, C is capacitance, Q is flow rate, and V is the volume.

In summary, the characteristic time constant depends on the composition of the fluid, the fluid's upstream resistance against movement in the process line, and the bulk volume of the fluid flow (process flow).

A major difference from MWD/LWD techniques and programming techniques for DD tools is that the invention applies static pulses of which time intervals equals or exceeds the time constant of the inherent process system as described by equation [1].

In accordance each communication unit is provided with a clock that synchronizes and controls the input/output of data. Further each unit comprises a sensitive pressure transducer, a variable flow restriction and a process loop controller to read and generate pressure pulses for transmitting the signals.

Figure 4:
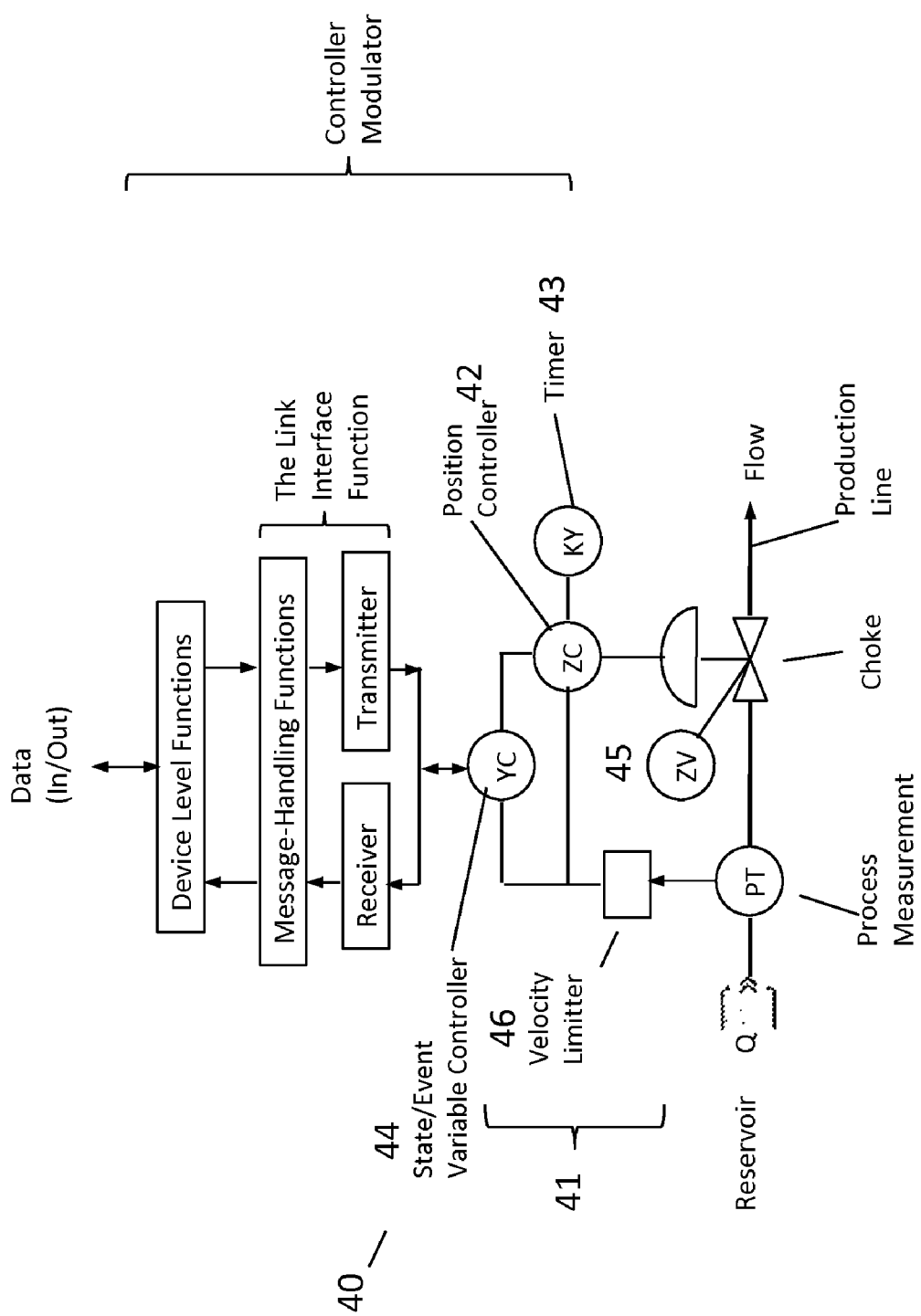
FIG. 4 shows a block diagram of a communication unit for example for use in the embodiment in FIG. 3.

FIG. 4 shows a block diagram of a communication unit 40 for example for use in the embodiment in FIG. 3. The unit comprises a control loop 41 for generating pressure drops over a variable restriction. A position controller 42 controls the performance of the control loop by comparing the value of a variable, such as a measured process parameter, for example flow line pressure, with a set-point and takes corrective action based on this comparison.

The dynamics of the control loop and measuring system 41 is fast compared to the major secondary elements in the process. For a long and volatile production line, this effect appears as dead time or lag. This prevents accurate control by means of conventional methods. In order to provide the best possible control due to the dead time, a timer 43 allows the process to settle to the change before the controller takes corrective action. The timer 43 may also be integrated in a state/event variable controller 44. In this configuration the restriction 45 may be an on/off control and directly driven by any of the controllers 43, 44. The restriction 45 may be programmed to activate and lock into one of two positions depending on the input variable from the controller.

The effect of noise from the process flow is reduced by means of a velocity limiter 46, provided that the noise is higher in frequency and lower in amplitude than the pressure pulse signal response. In general flow processes are dominated by fast frequency noise. Because the useable signal is fast and the process itself is slow, the noise filtering is difficult. The filter is an adaptive low-pass filter and the parameters are tuned to match the response of the process loop and the dead time.

Figure 5:
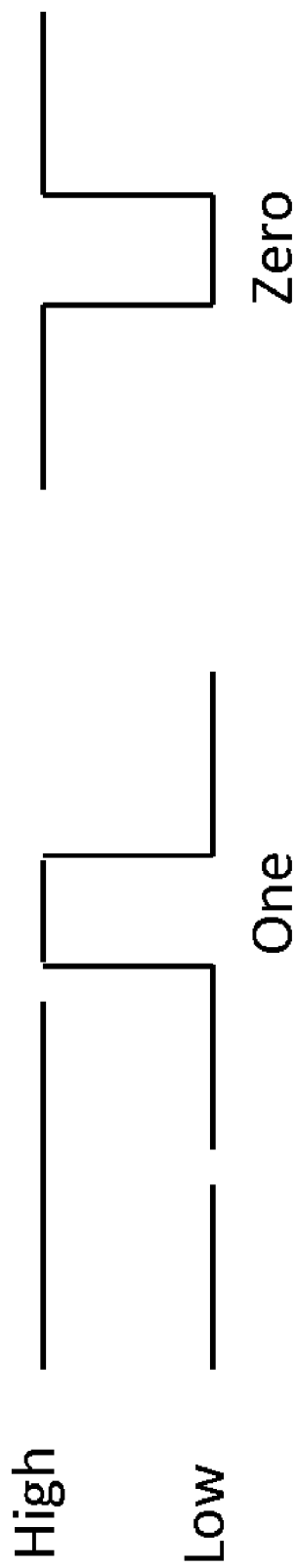
FIG. 5 illustrates an example of transmission code for use in a system according to the invention.

FIG. 5 illustrates a transmission code for use in a system according to the invention The transmission is implemented using a two level code as shown. A logic "one" is represented by a high pressure state/level, and logic "zero" is represented by a low level. The high level may also represent "idle" state or vice versa, depending on which direction one wants to communicate (upstream or downstream).

Figure 6:
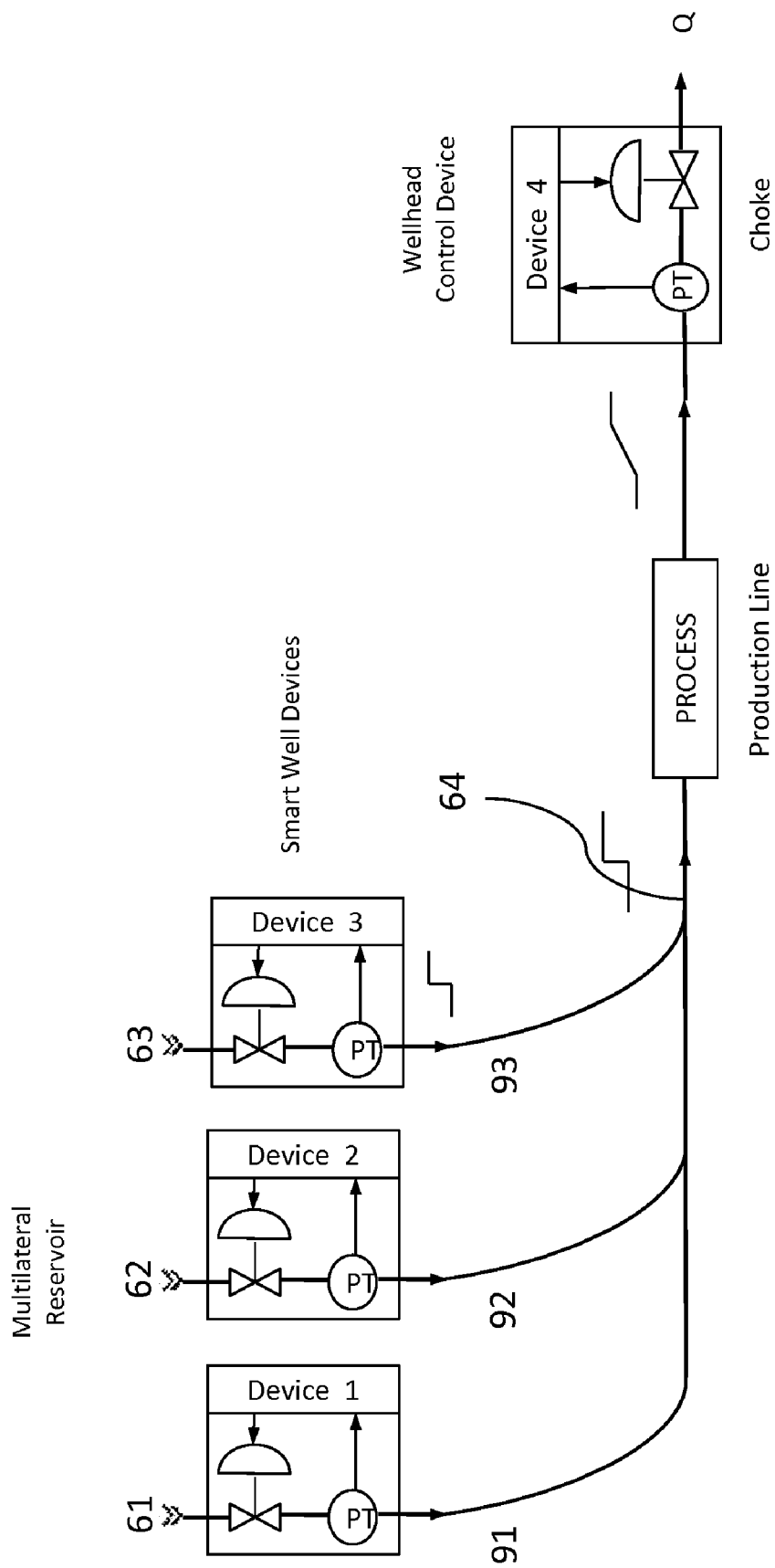
FIG. 6 shows an example on an application in a multi lateral well system.

FIG. 6 shows an example on an application in a multi lateral well system. This configuration comprises an assembly of measurement and inflow control devices 61-63, each comprising a communication unit. The devices 61-63 are all fitted to respective branches of the wellbore completion 64. At the surface a device including a choke valve and communication unit is located, eg. as a part of the wellhead assembly. Data from the downhole sensors are transmitted to surface and is translated into corrective action when the well requires inflow control. This opens the possibility of field or reservoir management as well as optimizing the well production.

The tasks of the surface station are to communicate with the wellbore devices. By appending a unique address to each device attached to the wellbore completion, a fully functional bus and bi-directional communication link is established.

Figure 7:
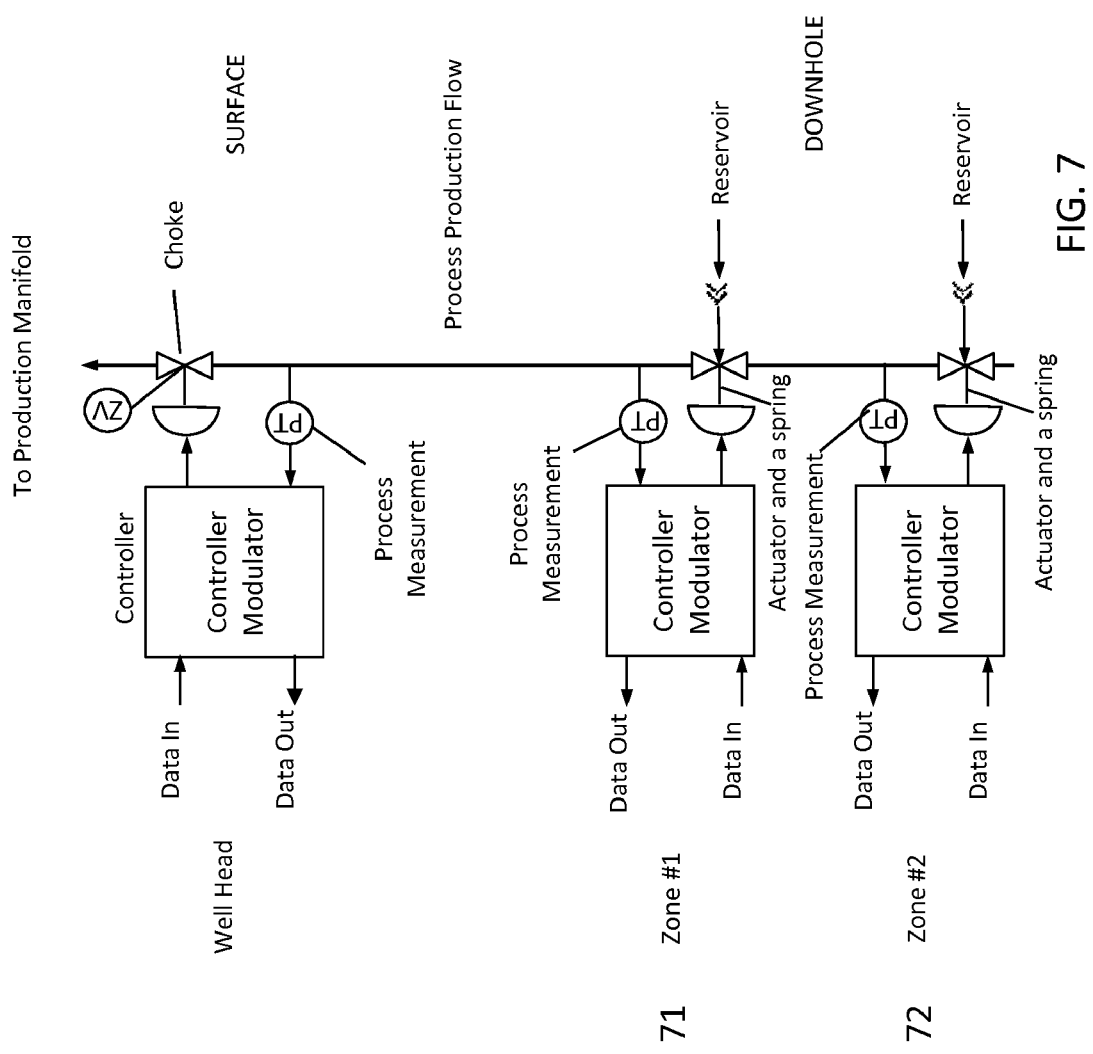
FIG. 7 show another example on an application in a monobore, multizone well system.

FIG. 7 show another example on an application in a monobore, multi-zone well system. Here the devices 71, 72 are located in the same branch of a well, but associated with different reservoir zones, and the functionality of the system is the same as described in connection with FIG. 6.

The invention claimed is:

1. System for wireless communication in a producing well system associated with oil and gas production, comprising:
    at least one well bore,
    at least two communication units, the communication units each comprising a transmitter and receiver for sending and receiving data, the transmitter comprising a static pulse generation device adapted for generating static pressure fluctuations in the well's production fluid, and
    at least one control unit for controlling the communication between the communication units, wherein the transmitter is configured for monitoring and controlling the generated static pressure fluctuations according to the producing well system's time constant in order to provide static pressure fluctuation characteristics that match the producing well system, wherein the time constant refers to the time delay between transmitting and receiving a pulse between the communication units.

2. System according to claim 1, wherein each of the communication units comprise a fail-safe mechanism.

3. System according to claim 2, wherein the static pulse generation device is a choking device that modulates the flow of the production fluid, and that the fail-safe mechanism is configured to return the choking device to a passive mode in case of a system failure, whereby the pulse generation device returns from whatever state it is at the occurrence of the system failure to a position where a minimum choking effect is imposed on the flow of the well's production fluid.

4. System according to claim 1, wherein parameters of the static pressure fluctuations are changed in an adaptive process.

5. System according to claim 1, wherein the communication units and/or the control unit comprise data conversion means to convert data for transmission.

6. System according to claim 1, wherein the transmitter and receiver are adapted for sending and receiving data by means of the production fluid.

7. System according to claim 1, wherein the transmitter and receiver are adapted for transmitting and receiving signals by means of fluctuations in the production fluid.

8. System according to claim 1, wherein the communication units are physically connected to a process pipe.

9. System according to claim 1, wherein that the communication units have equal access to the data transmitted in the production fluid.

10. System according to claim 1, wherein the control unit is integrated in a communication unit.

11. System according to claim 1, wherein at least one of the communication units is connected to or integrated in an ordinary well device/instrument.

12. System according to claim 1, wherein the regular stream/flow of the production fluid constitutes the carrier for the data to be transmitted.

13. System according to claim 1, wherein the receivers comprise a static pulse generation device adapted for generating static pressure fluctuations in the production fluid.

14. System according to claim 1, wherein it further comprises at least one sensor located in the well for providing sensor data for transmission, and a receiver located at the surface.

15. Method for communicating in a producing well system comprising at least one well bore, the method comprises:
    providing at least two communication units, the communication units each comprising a transmitter and receiver for sending and receiving data, and at least one control unit for controlling the communication between the communication units,
    sending data from one communication unit to another by means of generating static pressure fluctuations in the well's production fluid, and
    monitoring and controlling the generated static pressure fluctuations according to the producing well system's time constant in order to provide static pressure fluctuation characteristics that match the producing well system, wherein the time constant refers to the time delay between transmitting and receiving a pulse between the communication units.

16. Method according to claim 15, wherein parameters of the static pressure fluctuations are related to the fluid's behaviour.

17. Method according to claim 15, wherein parameters of the static pressure fluctuations are changed in an adaptive process.

18. Method according to claim 15, wherein the communication units and/or the control unit comprise data conversion means to convert data for transmission.

19. Method according to claim 15, wherein data are converted in the communication units and/or the control unit for transmission.

20. Method according to claim 15, wherein the data are sent and received via the production fluid.

21. Method according to claim 15, wherein the data is sent and received by means of fluctuations in the production fluid.

22. Method according to claim 21, wherein the fluctuations in the production fluid are static pressure fluctuations.

23. Method according to claim 15, wherein the communication units have equal access to the data transmitted in the production fluid.

24. Method according to claim 15, wherein the regular stream/flow of the production fluid constitutes the carrier for the data to be transmitted.

25. Method according to claim 15, wherein static pressure fluctuations are generated in the production fluid by means of a static pulse generation device.

26. Method according to claim 15, wherein it transmits sensor data provided from a sensor in the well to a receiver located at the surface.

* * * * *